(12) United States Patent
Zimmerman et al.

(10) Patent No.: US 8,814,482 B2
(45) Date of Patent: Aug. 26, 2014

(54) TOOL HEAD FOR A ROTATING TOOL

(75) Inventors: Armin Josef Zimmerman, Oberviechtack (DE); Xaver Spichtinger, Oberviechtach (DE); Bernhard Eckl, Rottendorf (DE); Heinrich Georg Manner, Guteneck (DE)

(73) Assignee: Kennametal Inc., Latrobe, PA (US)

( * ) Notice: Subject to any disclaimer, the term of this patent is extended or adjusted under 35 U.S.C. 154(b) by 675 days.

(21) Appl. No.: 13/029,366

(22) Filed: Feb. 17, 2011

(65) Prior Publication Data

US 2011/0250028 A1    Oct. 13, 2011

(30) Foreign Application Priority Data

Apr. 9, 2010    (DE) .................. 10 2010 014 322

(51) Int. Cl.
*B23D 77/10*    (2006.01)

(52) U.S. Cl.
USPC ........................................ 408/156; 408/161

(58) Field of Classification Search
USPC ................. 408/156, 154, 153, 161
See application file for complete search history.

(56) References Cited

U.S. PATENT DOCUMENTS

| | | | |
|---|---|---|---|
| 1,389,519 A * | 8/1921 | Lenhart .................. | 408/160 |
| 1,697,509 A * | 1/1929 | Marty, Jr. .................. | 408/156 |
| 2,385,999 A * | 10/1945 | McCallion .................. | 408/164 |
| 2,556,372 A | 6/1951 | Johnston et al. | |
| 3,195,376 A | 7/1965 | Bader | |
| 3,320,833 A * | 5/1967 | Andreasson .................. | 408/57 |
| 4,487,532 A | 12/1984 | Hamilton | |
| 4,705,435 A * | 11/1987 | Christoffel .................. | 408/59 |
| 5,163,790 A | 11/1992 | Vig | |
| 6,575,672 B1 | 6/2003 | Maier | |
| 2007/0127992 A1* | 6/2007 | Spichtinger et al. ....... | 407/39 |

FOREIGN PATENT DOCUMENTS

| | | | |
|---|---|---|---|
| CN | 101444856 A | 6/2009 | |
| DE | 100 60 283 C1 | 6/2002 | |
| DE | 202007015595 U1 * | 1/2008 | ............ B23D 77/00 |
| WO | 2008/155104 A1 | 12/2008 | |

OTHER PUBLICATIONS

Jan. 16, 2014—K-2946DEFR1—Search_Report.

* cited by examiner

*Primary Examiner* — Daniel Howell
*Assistant Examiner* — Chwen-Wei Su
(74) *Attorney, Agent, or Firm* — Larry R. Meenan, Esq.

(57) ABSTRACT

A tool head (10) for a rotating tool (2) includes a basic body (8), an annular portion (12) arranged on an end face on the basic body (8) and surrounds a cavity (22), and an adjusting device (18) including an adjusting screw (32) with a shank (34) and an adjusting sleeve (20). The shank (34) having a first shank portion (36) engaging a threaded bore (44) in the basic body (8). The adjusting sleeve (20) is displaceable by the adjusting screw (32) and has a conical outer face (30) that interacts with an inner face (28) of the annular portion (12) in such a way that, when the adjusting screw (32) is being screwed into the threaded bore (44), the annular portion (12) is spread open by the adjusting sleeve (20).

7 Claims, 1 Drawing Sheet

TOOL HEAD FOR A ROTATING TOOL

FIELD OF THE INVENTION

The invention relates to an expandable tool head for a rotating tool, in particular a reamer, milling tool or other kind of combination tool. One or more can be attached, for example glued, soldered or clamped, as desired, to the tool head. By means of an adjusting device integrated into the tool head, the tool head can be widened or expanded, with the result that the radial position of the cutting bodies can be set. Consequently, on the one hand, the basic position of the cutting bodies can be fixed in the manner of fine adjustment and, on the other hand, readjustment for wear compensation is possible.

BACKGROUND OF THE INVENTION

A tool head of the above-mentioned type for use in a reamer is known, for example, from international laid-open publication WO 2008/155104 A1. The adjusting device provided there comprises a conical adjusting sleeve which surrounds an adjusting screw in the manner of a floating mounting and the outer face of which interacts with an annular portion of the tool head, so that, overall, a wedge-type mechanism for widening the annular portion is implemented. Force transmission, required for setting purposes, from the adjusting screw to the adjusting sleeve takes place via a bearing face of a screw head provided on the adjusting screw. So that, when the adjusting device is being demounted, the adjusting sleeve can be removed in a simple way from the annular portion surrounding it, the adjusting screw is provided with a pull-out aid in the form of a threaded sleeve, of an annular collar or of a cross pin. The adjusting device therefore has a relatively large number of individual components and is comparatively complicated to manufacture.

Furthermore, it is desirable to have, as compared with the possibilities afforded by the wedge-type mechanism, improved adjustability of the expandable tool head, particularly within the framework of what is known as a fine adjustment with precision in the micrometer range.

SUMMARY OF THE INVENTION

The object of the present invention is to specify a tool head of the type initially mentioned, which has as few components as possible, is simple to manufacture and allows an especially precise fine adjustment of the radial widening. Furthermore, the adjusting device provided for this purpose in the tool head should require as little installation space as possible, so that the tool head can, as required, have a highly compact design.

This object is achieved, according to the invention, by means of the features of claim 1.

Accordingly, the tool head is characterized in that the adjusting sleeve is provided with an internal thread, the adjusting screw has a second shank portion with a second external thread which is in engagement with the internal thread of the adjusting sleeve, either the two external threads possessing the same flight direction, and the first external thread having a greater lead than the second external thread, or the two external threads possessing different flight directions.

The adjusting screw is therefore designed in the manner of a differential screw and has two thread regions of different kinds The first thread region, in the mounted state, is in engagement with an associated threaded bore in the basic body of the tool head. The threaded bore forms a receptacle for the adjusting screw in the region of the first threaded portion and fixes the adjusting screw in the basic body. The second thread region of the adjusting screw is in engagement with an internal thread, coordinated with it, of the adjusting sleeve.

In a first variant, the two thread regions of the adjusting screw, and correspondingly also the threaded bores in the basic body and in the adjusting sleeve, have the same flight direction (for example, right-handed). In this case, the first thread region, assigned to the threaded bore in the basic body, of the adjusting screw possesses a greater lead (also designated as thread pitch) than the second thread region assigned to the threaded bore of the adjusting sleeve.

According to the fundamental operating principle of a differential screw of this kind, a differential mechanism, as it is known, is therefore implemented, in which the resulting axial stroke of the adjusting sleeve is always lower than the axial stroke of the adjusting screw when the latter is screwed into the threaded bore of the basic body. Since the resulting axial stroke of the adjusting sleeve depends on the difference between the leads of the two thread regions, in the extreme case of a very small lead difference, the stroke of the adjusting sleeve brought about during a rotation of the adjusting screw can be kept very low. Owing to the thread step-up, an especially precise fine adjustment of the axial position of the adjusting sleeve becomes possible independently of the conical geometry of the outer face of the adjusting sleeve, thus giving rise in a way known per se to the desired spreading or expansion of the tool head in the radial direction as a result of the wedge effect of the adjusting sleeve. In other words, in the present invention, in addition to the known wedge-type mechanism a further mechanism which extends and improves the setting possibilities is also implemented by the differential screw.

In a second variant, the two threaded portions of the adjusting screw have different flight directions. That is to say, one threaded portion is left-handed and the other right-handed. The associated internal threads of the receptacle in the basic body of the tool and in the adjusting sleeve are, of course, adapted to this configuration. Since, in this variant, the effective stroke travel of the adjusting sleeve in the axial direction depends on the sum of the leads of the two thread regions, a correspondingly high step-up can be provided, so that, by means of relatively small rotational movements on the adjusting screw, a relatively high force component can be introduced into the annular portion of the tool head via the adjusting sleeve acting as a spreading cone.

In both instances, the differential screw also makes it possible to release the adjusting device easily. Indeed, when the annular portion is being spread open, the actuating sleeve is usually braced markedly in the receptacle, that is to say in the annular portion, due to the high force introduced. However, when the differential screw is rotated counter to the tensioning direction, it is easily released from this state of tension, since, as a result of the step-up ratio, it then also moves the adjusting sleeve out of the receptacle again.

After the release of the braced state between the adjusting sleeve and the annular portion, surrounding it, of the basic body, when the adjusting screw is unscrewed further out of the threaded bore in the basic body, the adjusting sleeve is also simply moved out of the annular portion, since it is connected positively to the adjusting screw via the second threaded portion. A pull-out aid, such as is preferably provided in the above-mentioned prior art, is not required.

As is known from the prior art, the axial movement of the adjusting sleeve which is brought about by the adjusting screw is converted by the conical outer contour of the adjusting sleeve into a radially outward-acting spreading force leading to the spreading or expansion of the annular portion which is elastically deformable within certain limits. The term "conical" is to be understood in a broad sense in this context and covers the general case where the outer face of the adjusting sleeve has, as seen in cross section, a radius which widens continuously toward the end of the tool head, as seen in the axial direction, within an interactive region intended to interact with the inner face of the annular portion. In other words: the cone formed by the adjusting sleeve may also be bulged slightly in the form of a bell or be indented in the form of a trumpet (crown).

In an especially advantageous refinement, the adjusting screw and the adjusting sleeve are arranged, countersunk completely, in the cavity surrounded by the annular portion of the basic body, that is to say do not project with respect to the annular portion in the region of the end face of the tool head. Blind holes and steps in a workpiece can consequently be machined without difficulty.

In a further advantageous refinement, the adjusting screw is designed as a headless pin, that is to say possessing no head projecting radially from the shank. A highly compact version is thereby possible in the radial direction, so that tools having a very small nominal diameter can be implemented. This is possible since, in contrast to the prior art initially mentioned, there is no need for a bearing face on the inside of the screw head in order to transmit the axial thrust force from the adjusting screw to the adjusting sleeve. In the present case, this is achieved, instead, by the threaded portion, cooperating with the adjusting sleeve, of the adjusting screw.

Expediently, the headless pin is provided on the end face with a screw profile, for example in the form of a hexagon socket. Of course, other customary inner profiles, for example slotted, multi-toothed, etc., can also be used.

In an advantageous refinement, the adjusting sleeve may be pierced by axial and/or radial bores (fluid ducts) so that coolant and/or lubricant can be conducted through the adjusting sleeve and therefore through the tool head, in particular for the machining of blind holes. The same applies to the adjusting screw with central and/or lateral bores.

In an advantageous development, a scale, for example a line scale, is provided on the annular end face, visible from outside in the mounted state, of the adjusting sleeve and/or of the annular portion. This line scale can cooperate with a reference point on the screw end face in such a way that a screwing movement over a specific number of lines corresponds to a defined increase in diameter.

The annular portion is preferably an integral part of the basic body. However, it may also be manufactured separately and be joined together with the remaining part of the tool head or tool, for example by welding. In order to achieve the desired expansion or increase in diameter of the annular portion, which may amount, for example, to half a percentage point of the basic diameter in the non-loaded state, the tool head must be composed in this region of a correspondingly expandable material, for example of steel, powder or heavy metal. The true running accuracy of the tool should amount, for example, to 3 μm both before and after setting with the aid of the adjusting device. Very high precision is therefore required.

Expediently, depending on the design of the tool as a reamer, milling tool or the like, a number of cutting edges or cutting elements are provided on the outside of the annular portion, the radial position of these being adjustable in the way described above by means of the adjusting device. The cutting elements may in this case be attached as desired, for example glued on, soldered on, welded on or clamped.

The advantages achieved by means of the invention are, in particular, that the use of a differential screw as part of an adjusting device with a conical adjusting sleeve allows an especially precise fine adjustment of the radial expansion of an expandable tool head. By the adjusting sleeve being used, no frictional forces are transmitted to the annular portion of the tool head during bracing. To be precise, as soon as the adjusting sleeve comes to bear, flush, in the surrounding receptacle, that is to say in the annular portion, and has been braced, said adjusting sleeve does not rotate any further, but, instead, when the adjusting screw penetrates further, is displaced only in the axial direction and at the same time, as a result of its conical outer contour, expands the tool head. As compared with solutions known hitherto, the tool head according to the invention manages with fewer parts and can be mounted more easily.

BRIEF DESCRIPTION OF THE DRAWINGS

An exemplary embodiment of the invention is explained in more detail below by means of a drawing in which, in each case in a simplified and diagrammatic illustration.

Identical parts are given the same reference symbols in all the Figures.

DETAILED DESCRIPTION OF THE INVENTION

Figure 1:
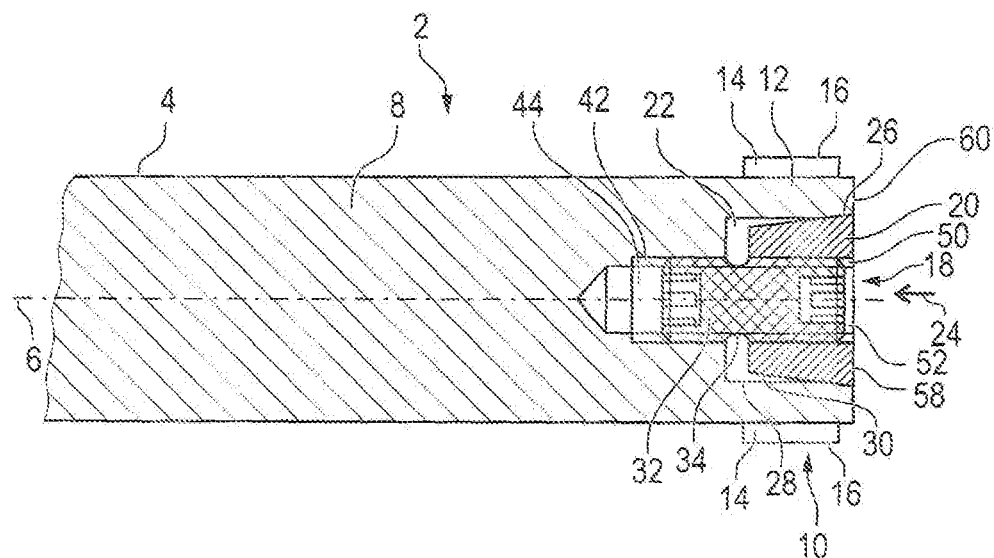
FIG. 1 shows a tool with an expandable tool head in longitudinal section.

The tool 2, the detail of which is illustrated in longitudinal section in FIG. 1, is a reamer for the fine machining of bores, in particular in metal parts. However, it could also be a milling tool or another kind of combination tool. The tool 2 comprises an elongate tool shank 4 with a basic body 8 designed essentially radially symmetrically with respect to a mid-axis 6, and also a tool head 10 provided on the end face (here on the right) on the tool shank 4. The tool head 10 has an annular portion 12 which is integrally formed onto the basic body 8 and on the outsides of which a number of cutting elements 14 are attached or integrally formed in a known way (indicated merely diagrammatically here). Furthermore, depressions may be provided on the outside of the basic body 8, which act as chip spaces for transporting away chips occurring during the machining of workpieces. At the left end, not illustrated here, the tool shank 4 may be coupled to a machine tool which sets the tool 2 and consequently, in particular, the cutting elements 14 in rotation about the mid-axis 6.

In the precision machining of workpieces, it is important that the outer cutting edges 16 of the cutting elements 14 maintain a predetermined radial distance from the mid-axis 6 with an accuracy in the micrometer range. To carry out an initial basic setting, but also for readjustment for wear compensation purposes, the tool head 10 has an adjusting device 18, by means of which the radial position of the cutting elements 14 can be adjusted, as required, within certain limits.

Figure 3:
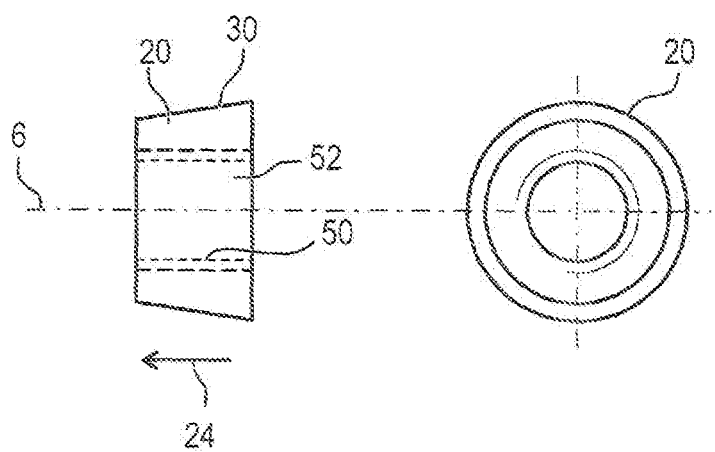
FIG. 3 shows an adjusting sleeve of the tool head according to FIG. 1 in longitudinal section (on the left) and in a top view of this end face (on the right).

The adjusting device 18 comprises an adjusting sleeve 20 which has an essentially conical outer contour and, in the mounted state illustrated here, is arranged in the cavity 22 of essentially cylindrical configuration surrounded by the annular portion 12. In an expedient adaptation to the outer contour of the adjusting sleeve 20, there may also be provision for the cavity 22 to widen in a slightly funnel-shaped manner in an outer portion (here on the right). The outside diameter of the adjusting sleeve 20, taken separately in FIG. 3, increases continuously opposite to the push-in direction 24, so that, during axial displacement in the push-in direction 24, the adjusting sleeve 20, by means of its outer face 30 bearing in a contact region 26 against the inner face 28 of the annular portion 12, expands the annular portion 12 from inside slowly and continuously. The further the adjusting sleeve 20 is pressed into the cavity 22 in the push-in direction 24, the more the diameter of the elastically deformable annular portion 12 increases as a result of the wedge effect and the further the cutting edges 16 of the cutting elements 14 travel outward in the radial direction. With the adjusting sleeve 20 subsequently pulled out of the cavity 22 opposite to the push-in direction 24, the tool head 10, previously expanded in the region of the annular portion 12, contracts again as a result of the elastic restoring forces of the material of said annular portion.

Figure 2:
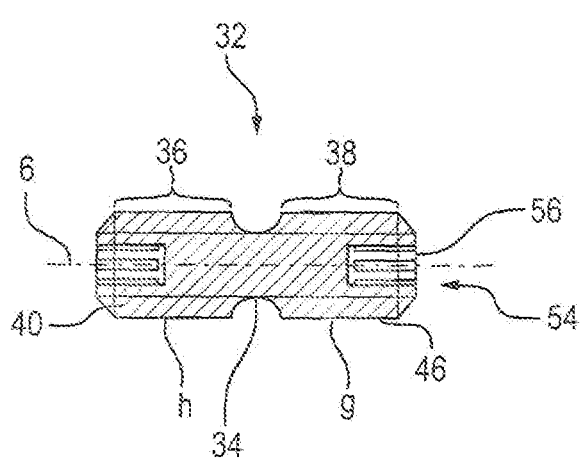
FIG. 2 shows an adjusting screw of the tool head according to FIG. 1 in longitudinal section.

An adjustment mechanism acting in an especially simple and precise way is provided in the present case by the use of an adjusting screw 32, here in the special form of a "headless" pin, which acts as a differential screw. The adjusting screw 32 is shown separately, enlarged, in FIG. 2. It comprises a shank 34 with a first shank portion 36 (here on the left) and a second shank portion 38 (here on the right). The first shank portion 36 is provided with a first external thread 40 which is coordinated in terms of its thread parameters (in particular, nominal diameter, flight direction and lead) with an associated internal thread 42 of a first threaded bore 44 introduced into the basic body 8. The threaded bore 44, as it were, prolongs the cavity 22 of wider diameter in the push-in direction 24 and, in the mounted state, receives the first shank portion 36 of the adjusting screw 32. By contrast, the second external thread 46 of the second shank portion 38 matches in terms of its thread parameters (in particular, nominal diameter, flight direction and lead) with a second internal thread 50 of a second threaded bore 52 introduced into the adjusting sleeve 20. The adjusting sleeve 20, in the mounted state, surrounds the adjusting screw 32 in the region of the second shank portion 38 and, as already described further above, bears, flush, with its outer face 30, at least in an annular contact region 26, against the inner face 28 of the annular portion 12.

The adjusting screw 32 serves, on the one hand, for fixing the adjusting sleeve 20 with respect to the basic body 8. It serves, on the other hand, for adjusting the axial position of the adjusting sleeve 20 and, consequently, the spreading force exerted on the annular portion 12. In a first variant, the first external thread 40 and the second external thread 46 (and, correspondingly, the internal thread 42 and the internal thread 50 of the respectively assigned threaded bores 44 and 52) have the same flight direction, that is to say, for example, are all designed as right-handed threads. In this case, the selected lead h of the first external thread 40 is greater than the lead g of the second external thread 46. When the adjusting screw 32 is being screwed into the associated receptacle, that is to say into the threaded bore 44 in the basic body 8, said adjusting screw is displaced by the amount of a travel h in the push-in direction 24 per revolution, as soon as the adjusting sleeve 20 has been braced in the annular portion 12 surrounding it and no longer rotates, while the adjusting sleeve 20 is displaced (ideally) only by the amount of a travel h-g in the push-in direction 24. Depending on the selected step-up, that is to say the difference between the leads h and g, the annular portion 12 can consequently be spread open especially sensitively, in so far as the selected depth of the threaded bore 44 in the basic body 8 is sufficiently great to ensure that the axial movement of the adjusting screw 32 is not prematurely blocked.

In a second variant, the two external threads 40, 46 (and, correspondingly, also the assigned internal threads 42, 50) possess different flight directions. One of the external threads 40, 46 is therefore designed as a right-handed thread and the other as a left-handed thread. If the adjusting screw 32, when being screwed into the threaded bore 44, is displaced by the amount of the travel h in the push-in direction 24, the adjusting sleeve 20 is displaced (ideally) by the amount of the travel h+g in the push-in direction 24. It is thus possible, even with a comparatively insignificant rotation of the adjusting screw 32, to exert a comparatively high spreading force on the annular portion 12. However, in both variants, of course, the pitch of the conical face formed by the adjusting sleeve 20 also plays a part in the actual overall step-up ratio of the adjusting device 18, that is to say in the ratio of the number of revolutions of the adjusting screw 32 to the increase in diameter of the annular portion 12 as a result of spreading.

At least on its end face 54, the adjusting screw 32 designed as a headless pin has an inner profile, for example in the form of a hexagon socket, which acts as a screw profile 56 and which is provided for interacting with a screwdriver, wrench, bit or the like for adjusting the spreading force exerted by the adjusting device 18. A scale, in particular a line scale, may be applied or engraved on the annular end face 58 of the adjusting sleeve 20 or on the annular end face 60 of the annular portion 12 and is calibrated, for example, in such a way that, for a given combination of thread parameters, a rotational movement of the adjusting screw 32 over a specific number of lines corresponds to a defined increase in diameter of the annular portion 12.

As is clear from FIG. 1, both the adjusting screw 32 and the adjusting sleeve 20 are arranged, countersunk completely, in the cavity 22 in the mounted state, that is to say do not project with respect to the margin of the annular portion 12 in the axial direction. The tool 2 is therefore especially suitable also for the machining of blind holes or steps in workpieces.

Having described presently preferred embodiments the invention may be otherwise embodied within the scope of the appended claims.

What is claimed is:
1. A tool head for a rotating tool, comprising:
a basic body with a mid-axis and with an end face;
an annular portion arranged on the end face on the basic body and surrounds a cavity having a cylindrical configuration; and
an adjusting device which acts from inside on the annular portion and comprises an adjusting screw with a shank and an adjusting sleeve, the shank of the adjusting screw having a first shank portion engaging into an assigned threaded bore in the basic body and having a first external thread, the adjusting sleeve surrounding the shank of the adjusting screw and being arranged at least partially in the cavity, the adjusting sleeve being displaceable in the direction of the mid-axis by means of the adjusting screw, the adjusting sleeve having a conical outer face that interacts with an inner face of the annular portion in such a way that, when the adjusting screw is being screwed into the threaded bore, the annular portion is spread open by the adjusting sleeve,
wherein the adjusting sleeve is provided with an internal thread, and
wherein the adjusting screw has a second shank portion with a second external thread which is in engagement with the internal thread of the adjusting sleeve, and
wherein the two external threads possess the same flight direction and the first external thread has a greater lead than the second external thread (h>g), or the two external threads possess different flight directions,
wherein the adjusting screw and the adjusting sleeve are completely countersunk in the cavity.

2. The tool head as claimed in claim 1, wherein the adjusting screw is designed as a headless pin.

3. The tool head as claimed in claim 2, wherein the headless pin is provided on the end face with a screw profile in the form of a hexagon socket.

4. The tool head as claimed in claim 1, wherein the annular portion is an integral part of the basic body.

5. The tool head as claimed in claim 1, wherein a number of cutting edges is provided on the outside of the annular portion.

6. The tool head as claimed in claim 1, wherein the tool is a reamer or milling tool.

7. The tool head as claimed in claim 1, wherein the adjusting screw is designed with a central and/or lateral bore.

* * * * *